United States Patent
Sullivan

Patent Number: 5,623,386
Date of Patent: Apr. 22, 1997

[54] MAGNETIC RECORDING COMPONENT

[76] Inventor: Thomas M. Sullivan, 499 Park 800 Dr., Suites E and F, Greenwood, Ind. 46143

[21] Appl. No.: 332,419

[22] Filed: Oct. 31, 1994

[51] Int. Cl.$^6$ ............................................. G11B 5/82
[52] U.S. Cl. ............................................. 360/135
[58] Field of Search ................... 360/135, 131; 428/694 TP, 64.3, 328, 329, 336; 427/130, 131, 128

[56] References Cited

U.S. PATENT DOCUMENTS

| | | |
|---|---|---|
| 3,681,225 | 8/1972 | Genma et al. |
| 3,704,211 | 11/1972 | Phillips. |
| 4,069,360 | 1/1978 | Yanagisawa et al. ............ 428/64 |
| 4,239,819 | 12/1980 | Holzl ............................ 427/255.2 |
| 4,376,963 | 3/1983 | Knoop et al. ..................... 360/135 |
| 4,598,017 | 7/1986 | Bayer et al. ...................... 360/135 |
| 4,637,963 | 1/1987 | Nishimatsu et al. ............. 360/135 |
| 4,961,913 | 10/1990 | Sullivan .......................... 423/351 |
| 5,356,522 | 10/1994 | Jal et al. ........................ 204/192.15 |
| 5,374,412 | 12/1994 | Pickering et al. ................ 423/346 |

FOREIGN PATENT DOCUMENTS 57-56309  4/1982  Japan.

*Primary Examiner*—Stuart S. Levy
*Assistant Examiner*—Allen Cao
*Attorney, Agent, or Firm*—Lowe, Price, LeBlanc & Becker

[57] ABSTRACT

A magnetic memory recording component comprises a substrate adapted to support a magnetic memory storage medium coating. The substrate has at least a silicon carbide ceramic outer surface. If the silicon carbide ceramic outer surface has a depression in the surface thereof, the maximum depression of the maximum dimension as measured in any direction, e.g. width, depth, length or the like of the depression is less than 0.0001".

9 Claims, 1 Drawing Sheet

MAGNETIC RECORDING COMPONENT

FIELD OF THE INVENTION

This invention relates to components for magnetic recording or "hard disk drive" devices.

BACKGROUND ART

Hard disk drives consist of a disk or multiplicity of disks separated by spacers which are rotated at high speeds on a spindle by a small electric motor inside an aluminum case. A small head at the extremity of a supporting arm glides above the surface of the disks on an aerodynamic film of air at clearances below 3 millionths of an inch. The head selectively magnetizes minute spots on the rotating disk to create a binary code representing data to be stored or retrieved. The magazine article "Disk-Storage Technology", by White published in the August 1980 issue of *Scientific American* is included in this application by reference.

Though many different materials have been tried, rotating disks are usually composed of an aluminum covered with a thin magnetic medium layer. Aluminum disks typically measure 2.559 inches OD, 0.7884 inch ID, and 0.035 inch thick. Larger diameter disks have greater thickness to maintain surface planarity when spinning. The magnetic medium layer is the part that is magnetized or demagnetized to store or retrieve data while the aluminum disk or substrate provides the mechanical strength and rigidity to support the magnetic medium under high centripetal loads without contacting the head in relative motion over its surface.

The magnetic medium layer is typically between 0.5 and 1.5 micrometers thick and can be used for record densities of up to 10,000 bpi for a magnetic layer in a curable binder. Other methods of applying the magnetic layer are utilized to increase areal density. Higher areal densities result from reducing magnetic layer thickness as well as changing magnetic values. U.S. Pat. No. 3,704,211 shows that areal density depends on the layer thickness and coercive force. Reducing layer thickness by increasing the packing density of magnetizable zones and by increasing the coercive force is, therefore, a desirable objective. This is achieved by applying extremely thin but uniform magnetic layers by sputtering metals of the eight subgroup of the Periodic Table of Elements in a high vacuum onto a hard disk substrate. Because aluminum is electrically conductive, it can be easily charged to attract a plasma containing elements of the magnetic media to its surface. Disk substrates which are not electrically conductive and thus, cannot be charged, require the careful growing of the electrically conductive magnetic memory coating across the surface of the disk to act as a pole to draw the plasma. Magnetic recording media deposited by sputtering tend to be thinner, more uniform, and higher in coercive force than those resulting from other processes.

Providing substrates which can be made thinner to reduce energy consumption, flatter and stiffer to reduce head glide height, and more easily finished to remove surface defects to eliminate "dead spots" in the magnetic recording medium is a considerable problem in connection with manufacturing hard disk drives.

Magnetic recording disk substrates are usually made from aluminum metal because it is not ferromagnetic, it can be finished with readily available tools and processes, and it is electrically conductive. As a material for magnetic recording disks, however, aluminum has reached a stage of development at which it can no longer be made significantly thinner without sacrificing rigidity and cannot be finished to higher standards of surface planarity. Highly polished aluminum substrates are also easily scratched. Scratches frequently appear during polishing which are very difficult to remove. Small recesses in the substrate surface <0.3 micrometer across result in dead spots because the sputtered magnetic medial coating is unable to bridge the gap. Alternatively, intensive lapping and polishing can reduce surface planarity. Poor surface planarity, in turn, can cause the head to "crash" into the hard disk rather than glide over its surface.

Hard disk drive magnetic memory recording devices usually have more than two hard disks coated with magnetic media on both sides of each disk. Disks are separated by a spacer ring near the internal diameter of the disk. Spacer surfaces in contact with disks must be even more parallel than the recording surfaces of the disks to prevent crashing the head into the recording media of the disk substrate surface as the disk rotates. Spacer materials must also have a coefficient of thermal expansion equivalent to disk substrates to avoid thermal stresses, and, like disk substrates, must not be ferromagnetic so magnetic fields in the magnetic recording media are not perturbed. Hard disk drives using aluminum disks typically use aluminum spacers with surfaces parallel to <0.000050 inch. Aluminum is so soft and ductile that finishing surfaces to the required standards can only be accomplished at substantial cost. The need for parallelism is further complicated by potentially uneven torque on metal bolts and screws used to hold assemblies of disks and spacers together. Small bolts and screws are notoriously difficult to mechanically turn to uniform torque, in part because all bolts and screws are slightly different with respect to thread pitch and head location. Non-uniform torque warps substrates and spacers.

Disk substrates rotate on a non-ferromagnetic metal shaft transmitting motive torque from a minute electric motor to spin disks and spacers. Like spacers, shafts or spindles used in connection with aluminum disk substrates and motors are usually made from aluminum to eliminate stresses and distortions due to CTE mismatch as well as ferromagnetic fields other than those in the magnetic recording media.

The entire hard disk drive is encased in a two-piece aluminum shell forming a frame to support and protect disk drive components. Since maintaining uniform CTE and non-ferromagnetic behavior throughout the structural components of the hard disk drive is important, cases are made from aluminum like the spindle, spacers and disks. Unfortunately, aluminum develops an aluminum oxide exterior surface or patina when exposed to air. Aluminum oxide from the surfaces of exposed aluminum parts can fall or be drawn onto the magnetic media coated surfaces of the rotating disks like large meteors striking otherwise serene surfaces on planets. Inductive heads gliding just above the disk surface can crash into relatively large debris. Cases are usually coated with an epoxy surface to reduce spalling, but epoxy can itself spall or emit byproducts in the course of curing that cause head crashes.

Prior art describes a number of technologies for hard disk drives. U.S. Pat. No. 3,681,225, U.S. Pat No. 4,069,360, U.S. Pat. No. 4,239,819, U.S. Pat No. 4,376,963, U.S. Pat. No. 4,598,017, and U.S. Pat No. 4,637,963 are known to the Applicant and incorporated by reference.

U.S. Pat. No. 3,681,225 describes a magnetic disk where a magnetic layer is made by electro-deposition on a synthetic resinous core.

U.S. Pat. No. 4,069,360 describes a magnetic recording element having a disk made of an alloy with a polished layer of non-ferromagnetic alloy being provided which covers the surface of the alloy disk. A thin film constituting a ferromagnetic recording medium cover the outer layer. An amorphous inorganic oxide layer in turn covers the magnetic recording medium.

U.S. Pat. No. 4,376,963 describes a composite structure for magnetic recording. The structure has a core of polymeric material with at least one silicon disk. The outer surface is coated with the magnetic recording medium. The surface of the silicon disk is excellent with respect to flatness and smoothness, but the disadvantage of this disk is that silicon metal reacts with other metals contained in the magnetic recording medium to form eutectic compositions lacking the needed anisotropy unless the sputtered plasma is deposited on a relatively cold disk substrate, in which case the recording medium will have little coercive force and poor areal density.

U.S. Pat. No. 4,598,017 describes a substrate made by bonding porous silicon carbide ceramic infiltrated with silicon metal (SiSiC) for increased density to a polymeric frame. The SiC has sufficient modulus of elasticity, hardness, and non-ductility to be finished to high standards of surface finish and planarity. However, silicon carbide made by reaction bonding or reaction sintering that has been infiltrated with silicon metal, has too high a level of electrical resistivity for rapid, uniform sputtering. Coating a SiSiC substrate by "growing" a sputtered magnetic layer across non-conductive spots in the substrate in high volume production may leave discontinuities in the magnetic recording layer. The result is "dead spots" on the disk that are costly to detect and prevent. Lapping and polishing a SiSiC disk with a surface having hard non-ductile SiC regions alternating with soft relatively ductile Si metal is more difficult and costly than with a disk with uniform hardness and ductility.

U.S. Pat. No. 4,637,963 describes a substrate made from polymers. Polymers are non-conductive as a rule with respect of sputtering, but too ductile to easily finish to high standards of planarity and surface finish. Glass or metal oxide ceramic substrates are subject to precipitations around grain boundaries. Surface defects on glass/ceramic substrates associated with grain pullout are surrounded with precipitations of salts that act like metallurgical fluxes to metal plasmas created during sputtering. Sputtered magnetic media coatings lose anisotropy needed to record data as a binary code when precipitated fluxes fluidize depositing metals. Large dead spots result from surface flaws, even sub-micron sized grain boundaries. Elimination of pits larger than 0.05 micrometers by means of process control is very difficult in high volume production. Glass or glass/ceramic has the hardness and non-ductility needed for polishing but suffers from low temperature softening due to phase changes caused by instantaneous thermal gradients during lapping and polishing. High dielectric makes sputtering coatings onto glass or glass/ceramic slow and prone to discontinuities as the chargeable coating is "grown" across the surface of the substrate to maintain substrate bias.

Ceramic materials have many advantages as substrate materials that were recognized early in the development of hard drives. Compared to metals or polymers, ceramic materials are non-ductile and very hard. Required surface planarity and finish are more easily achieved with rigid, non-ductile substrate materials that are abraded during lapping and polishing rather than with non-rigid, ductile substrate materials that conform to abrasive surfaces without abrading. Ceramic materials, however, have not succeeded in the past because process technology was unable to approach the low cost per part required for production volumes reaching the tens of millions of units per year.

Powder sintering like hot isostatic pressing is slow, expensive, and results in materials with large surface pores compared to magnetic memory coating thickness and "bridging" capacity. Reactive Sintered Silicon Carbide (RSSiC) is made by consolidating finely divided silicon metal powder and carbon under thousands if not tens of thousands, of pounds per square inch pressure, followed by heating the compress until silicon metal reacts with carbon to form silicon carbide. The resulting silicon carbide ceramic part is crudely shaped and prone to warping when approaching the thickness of disk substrates. Plates are made over 0.125 inch thick and must be diamond ground to form 0.035 inch thick substrate blanks before lapping and polishing. RSSiC has pores up to 0.003 inch across, substantially larger than the 0.0001 inch maximum surface pore size acceptable for substrates. Pore size can only be reduced by high temperature consolidation under pressure such as by glass encapsulation hot isostatic pressing (HIP). HIP processing is very capital intensive and is unable to meet the unit volume and cost requirements for disk substrates.

U.S. Pat. No. 4,239,819 describes a Chemical Vapor Deposition (CVD) method for making silicon carbide in which silicon halide or silicon hydride gases are reacted with alkanes at elevated temperatures to deposit ceramic product on a heated surface. Deposition rates for material with small pores are slow, usually around 0.001 to 0.004 inch thickness per hour. Yields are usually less than 5% of reactants. Only crude shapes are possible. Finishing parts to substrate standards requires extensive diamond finishing. It is possible to make substrates by CVD, but the cost is more than ten times greater than for aluminum substrates.

Infiltrating RSSiC by CVD to densify a porous monolith is a slow process. Deposition rates must be slow in order to prevent closure of interconnected pores before they are completely filled with silicon carbide. Process temperature is lowered to avoid warping the substrate. Deposition rates ranging from 0.0001 to 0.0006 inch per hour are typical for infiltrating a porous substrate. infiltrating RSSiC monoliths typically requires several days of processing time to eliminate pores that would be unacceptable for magnetic media substrates.

Chemical Vapor Deposition has been attempted as a means of making silicon carbide substrates. In order to prevent warping, the process is conducted at reduced temperatures resulting in deposition rates analogous to Chemical Vapor Infiltration (CVI). Producing a crudely shaped monolith large enough to be ground to 0.035 inch is slower than CVI on an RSSiC substrate and again may require days of processing at elevated temperature. Extensive cutting and grinding are needed since neither CVI nor thick CVD products are precisely shaped. The cost of SiC substrates made by CVD is more than an order of magnitude greater than the cost of aluminum substrates.

Computer data, reduced to a sequence of binary pulses, is recorded on hard drives by creating a pattern of magnetized spots on a spinning disk. The disk is composed of a substrate supporting a thin coating of transition metal compounds susceptible to selective magnetizing and demagnetizing. Though usually made from highly polished aluminum metal, substrates have been made from glass compositions, carbon, ceramics, polymers, and composites. Extensive experiments with the use of ceramic and plastic compositions for substrates have been conducted. In particular, substrates made from silicon carbide made by powder metallurgy and chemical vapor deposition methods have been tried.

Powder metallurgy is an unsuitable process technology for making silicon carbide substrates because the pore size of parts made by versions of the process capable of meeting hard drive production volume requirements is too large for magnetic coating. Chemical Vapor Deposition or infiltration is an unsuitable process technology for making silicon carbide substrates because silicon carbide must be deposited so slowly to make standard disk substrates without warpage and unacceptable pore size, that it is not economically competitive with existing aluminum substrate technology.

SUMMARY OF THE INVENTION

It is a first object of the invention to reduce cost per megabyte of memory, increase storage capacity, improve reliability and reduce energy consumption per megabyte of storage capacity due to higher areal density and reduced weight for magnetic memory storage devices by utilizing new and improved components.

Another object of the present invention is to provide casings for magnetic memory storage devices that eliminate the need for epoxy coatings.

It is a further object of the present invention to utilize ceramic materials for magnetic memory storage components which are more easily finished to meet the storage device surface planarity and finish requirements.

The present invention also provides a more efficient utilization and conservation of energy resources by using ceramic materials as components of a magnetic memory storage or recording device, these components reduce energy consumption per megabyte of storage capacity due to higher areal density and reduced weight.

Other objects and advantages of the present invention will become apparent as a description thereof proceeds.

In satisfaction of the foregoing objects and advantages, the present invention is directed to a magnetic memory recording device and components thereof which are principally made of ceramic materials. In its broadest embodiment, the invention comprises the recording device components singularly or in combination so as to form a part or parts of the magnetic memory recording device.

The magnetic memory recording components of the present invention comprise at least one or more of the following: a substrate used to support a magnetic memory storage medium coating, the substrate having a silicon carbide ceramic outer surface without a single exposed pore, scratch, or other such depression in the surface of the disk substrate having at least one dimension larger than 0.0001 inch, and having no non-stoichiometric silicon or carbon other than that which may be residual from the process of making silicon carbide ceramic material; spacers separating adjacent substrates which spacers are made from silicon carbide ceramic, silicon nitride ceramic, silicon metal coated with a thin film of silicon carbide not more than 0.010 inch thick, carbon or graphite coated with a thin film of silicon carbide not more than 0.010 inch thick, or carbon or graphite, wherein the silicon carbide or silicon nitride materials may have up to 30% porosity by weight; a shaft utilized to provide a rotational axis for disk substrates and spacers, the shaft made from silicon carbide ceramic, silicon nitride ceramic, or silicon metal which may be coated with a silicon carbide thin film not exceeding 0.010 inch thickness; a casing enclosing working parts of the magnetic memory recording device, the casing made from silicon carbide ceramic, silicon nitride ceramic, or silicon metal which may be coated with a thin film of silicon carbide ceramic less than 0.010 inch thick wherein the silicon carbide or silicon nitride materials may have up to 30% porosity by weight, and self-holding machine taper pins for attaching components of the magnetic memory recording device, said pins pressed into sockets wherein the angle of the pins is between 0.5 and 7 degrees and the pins are made from silicon carbide, silicon nitride, or silicon metal.

DESCRIPTION OF THE PREFERRED EMBODIMENTS

Figure 1:
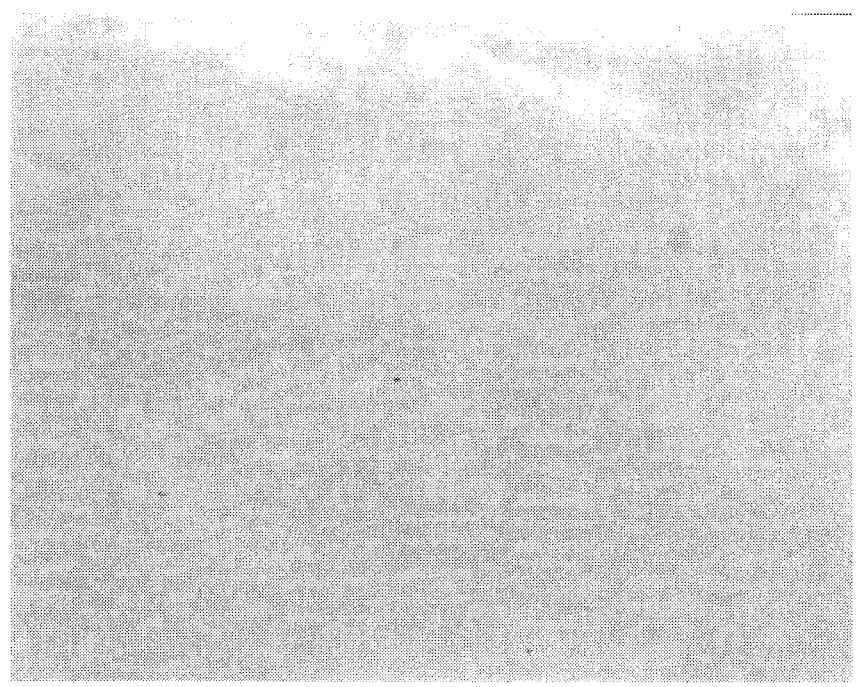
FIG. 1 shows a photomicrograph of a disk substrate surface at 2000× magnification. The photomicrograph depicts the restively non-porous silicon carbide ceramic surface of a disk substrate for a magnetic memory storage and retrieval device made in accordance with the teachings of the present invention.

Each embodiment of the present invention provides a magnetic memory recording device or hard disk drive using a disk substrate having a relatively non-porous silicon carbide ceramic surface with no exposed surface pore, scratch or other defect measuring more than 0.0001 inch across the largest planar dimension as shown in FIG. 1. Spacers made from porous silicon carbide ceramic, porous silicon nitride, carbon or graphite coated with a thin film of silicon carbide, or carbon or graphite are provided for separating silicon carbide or aluminum disk substrates. Disk substrates and spacers rotate on a silicon carbide ceramic, silicon nitride ceramic, or silicon metal shaft. Silicon carbide ceramic, silicon nitride, or silicon metal with a silicon carbide surface is used to make a casing for the hard disk drive. Components within the case are affixed with machine taper pins pressed into place. The machine taper pins are made from silicon carbide, silicon nitride, or silicon metal.

The silicon carbide disk substrate surface is lapped and polished to <50 microinches peak-to-valley surface planarity from OD to OD and <10 microinches Ra surface roughness. Before being coated with a magnetic memory storage medium coating, the disk substrate may be "textured" to <350 microinches peak-to-valley surface planarity. Disk substrates may be up to 12 inches in diameter and measure 0.004 to 0.035 inch thick to be compatible with magnetic storage and retrieval devices, or they may be made thinner than aluminum to take advantage of the high specific modulus of elasticity of SiC compared to aluminum. For example, a "65 mm" disk made from aluminum is 0.035 inch thick. The same diameter disk made from silicon carbide can be as little as 0.012 inch thick. Reducing rotating mass reduces energy consumption proportionally.

Figure 2:
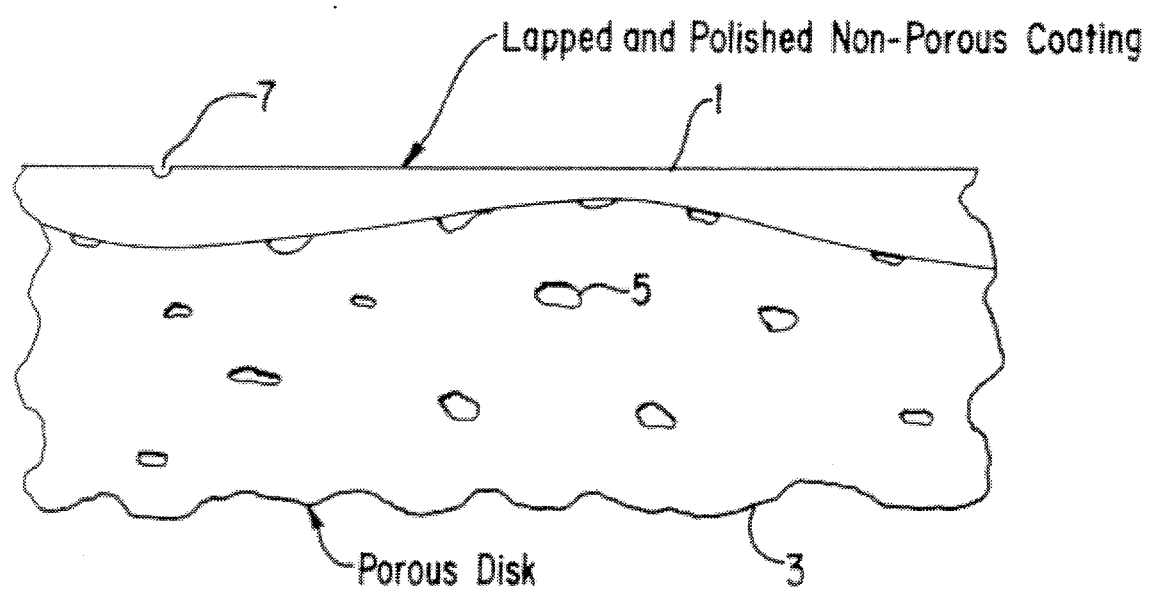
FIG. 2 shows a cross-sectional view through a polished disk made in accordance with some of the embodiments of the present invention.

Referring now to FIG. 2, one embodiment of the present invention provides the aforesaid, relatively non-porous, silicon carbide ceramic surface 1 on a comparatively porous silicon carbide ceramic monolith 3 having pores 5 larger than the maximum 0.0001 inch pores 7 which may be tolerated on the surface of the disk substrate. Another embodiment provides a ceramic disk substrate with no pore, either internally or exposed, larger than 0.0001 inch.

A further embodiment of the present invention provides a relatively non-porous silicon carbide ceramic surface on a pyrolytic carbon, graphite, or carbon-carbon composite disk. The pyrolytic carbon, graphite, or carbon-carbon composite may have pores larger than 0.0001 inch.

None of the preferred embodiments of the present invention utilize silicon metal to fill surface pores or to densify a porous ceramic monolith. Very small amounts of non-stoichiometric silicon metal or carbon are, however, common byproducts or coproducts of the making of silicon carbide ceramic by powder metallurgical, chemical vapor deposition, or supercritical fluid processing methods. U.S. Pat. No. 4,239,819 and U.S. Pat. No. 4,961,913 are incorporated into this application by reference.

Spacers made from silicon carbide, silicon nitride, or carbon or graphite can have equivalent CTE and therefore expand at the same rate as silicon carbide disk substrates. Porosity is not an issue because spacers are not coated with magnetic memory coating. Silicon carbide, silicon nitride, silicon carbide coated carbon or graphite, or carbon or graphite alone are relatively non-ductile and therefore can be easily polished to the required surface planarity and do not deform under load, yet have the rigidity needed to precisely maintain the relative position of the rotating disks. It is possible to polish these materials to more than an order of magnitude smaller parallelism and surface planarity tolerance than aluminum.

Silicon carbide, silicon nitride, or silicon metal shafts or spindles have significant advantages over other materials in connection with silicon carbide disk substrates and spacers. Silicon carbide, silicon nitride, and silicon metal have adequate strength and modulus of elasticity, are not ferromagnetic, and have equivalent CTE. Equivalent CTE is important for hard disk drives using silicon carbide disk substrates to prevent loosening the rotating assembly as the hard drive warms. Silicon carbide with up to 3% porosity by weight has sufficient strength and stiffness to be used for shafts or spindles.

Cases made from silicon carbide, silicon nitride, or silicon with a silicon carbide surface expand at nearly the same rate as other silicon carbide or silicon or carbon/graphite components of a hard disk drive, and thus, will hold the contents of the case in place during periods of thermal stress. In addition, silicon carbide, silicon nitride, or silicon carbide coated silicon metal does not shed a surface patina or layer that might cause clearance problems between heads and magnetic memory coated disk substrates. This feature eliminates the need for epoxy coatings generally used to "passivate" the surface of cases made from aluminum. Porosity of the case is not an issue as long as no interconnected pores exist that might enable ingress of environmental contaminants.

Machine taper pins such as Morse Taper, Brown & Sharpe Taper, Jarno Taper, American National Standard Taper, British Standard Taper and other similar tapers all have in common a "self-holding" feature, such that a machine taper pin pressed into a hole is so firmly seated that there is considerable frictional resistance to any force tending to turn, rotate, or extract the tapered pin. *Machinery's Handbook 23rd Edition* by Oberg et al published by Industrial Press, Inc., New York pages 897 to 916 are included in this application by reference. Unlike screws or bolts, pins tend to align parts. Pressing pins into place to affix disk drive assemblies has the distinct manufacturing advantage of allowing the use of a simple, reliable pressure transducer to accurately determine when enough pressure has been applied to hold parts in place without warpage. Automatic assembly is made simpler, more reliable, and faster.

I claim:

1. A magnetic memory recording component comprising:
    a) a substrate made of silicon carbide of a magnetic memory storage medium coating, said substrate comprising:
        i) a silicon carbide ceramic outer surface, a depression in the silicon carbide ceramic outer surface having a maximum dimension of 0.0001 inch, and
        ii) wherein said silicon carbide ceramic has no non-stoichiometric silicon and no carbon other than that which is residual from a process of making said silicon carbide ceramic material, said silicon carbide ceramic outer surface receiving said magnetic memory storage medium coating,
    b) spacers separating adjacent substrates which spacers are made from silicon carbide ceramic, silicon nitride ceramic, silicon metal coated with a thin film of silicon carbide not more than 0.010 inch thick, carbon or graphite coated with a thin film of silicon carbide not more than 0.010 inch thick, or carbon or graphite wherein the silicon carbide or silicon nitride materials may have up to 30% porosity by weight,
    c) a shaft utilized to provide a rotational axis of said disk substrates and said spacers made from silicon carbide ceramic, silicon nitride ceramic, or silicon metal which may be coated with a silicon carbide thin film not exceeding 0.010 inch thickness,
    d) a casing enclosing working parts of the magnetic memory recording device and made from silicon carbide ceramic, silicon nitride ceramic, or silicon metal which may be coated with a thin film of silicon carbide ceramic less than 0.010 inch thick wherein the silicon carbide or silicon nitride materials may have up to 30% porosity by weight, and
    e) self-holding machine taper pins for attaching components of the magnetic memory recording device, said pins pressed into sockets wherein the angle of the pins is between 0.5 and 7 degrees and the pins are made from silicon carbide, silicon nitride, or silicon metal.

2. The component of claim 1 wherein the silicon carbide ceramic outer surface has one of a textured contiguous flat surface having less than 350 microinches peak-to-valley maximum planarity from outer diameter to outer diameter and a contiguous flat surface having less than 50 microinches peak-to-valley planarity before texturing.

3. The component of claim 1 wherein the silicon carbide ceramic outer surface is polished to less than 10 microinches Ra surface roughness before texturing.

4. The component of claim 1 wherein the substrate has a thickness between 0.004 inches and 0.035 inches.

5. The component of claim 1 wherein the silicon carbide ceramic outer surface covers a porous silicon carbide monolith.

6. In a magnetic memory recording device wherein a substrate of a magnetic memory storage medium, the improvement comprising said substrate having a silicon carbide outer surface wherein a maximum dimension of a depression on the silicon carbide outer surface has a maximum size of 0.0001 inch and said substrate has no non-stoichiometric silicon and no carbon other than residual levels resulting from manufacture of the silicon carbide ceramic material, wherein the substrate surface has a contiguous flat surface having less than 350 microinches peak-to-valley maximum planarity from OD to OD when textured and less than 50 microinches peak-to-valley planarity before texturing and the substrate surface is polished to less than 10 microinches Ra surface roughness before texturing.

7. The improvement of claim 6 wherein said substrate is entirely ceramic and has a thickness between 0.004 inches and 0.035 inches.

8. In a magnetic memory recording device wherein a substrate of a magnetic memory storage medium, the improvement comprising said substrate having a silicon carbide outer surface wherein a maximum dimension of a depression on the silicon carbide outer surface has a maximum size of 0.0001 inch and said substrate has no non-stoichiometric silicon and no carbon other than residual levels resulting from manufacture of the silicon carbide ceramic material wherein the silicon carbide ceramic outer surface covers one of a porous silicon carbide monolith, a carbon monolith, a graphite monolith and a carbon-carbon composite monolith.

9. The improvement of claim 8 wherein said substrate is entirely ceramic and has a thickness between 0.004 inches and 0.035 inches.

* * * * *

UNITED STATES PATENT AND TRADEMARK OFFICE
CERTIFICATE OF CORRECTION

PATENT NO. : 5,623,386
DATED : April 22, 1997
INVENTOR(S) : Thomas M. Sullivan

It is certified that error appears in the above-identified patent and that said Letters Patent is hereby corrected as shown below:

Claim 1 should read as follows:

1. A magnetic memory recording component comprising:

a substrate made of silicon carbide of a magnetic memory storage medium coating, said substrate comprising:

i) a silicon carbide ceramic outer surface, a depression in the silicon carbide ceramic outer surface having a maximum dimension of 0.0001 inch, and ii) wherein said silicon carbide ceramic has no non-stoichiometric silicon and no carbon other than that which is residual from a process of making said silicon carbide ceramic material, said silicon carbide ceramic outer surface receiving said magnetic memory storage medium coating.

Signed and Sealed this

Nineteenth Day of August, 1997

Attest:

BRUCE LEHMAN

Attesting Officer

Commissioner of Patents and Trademarks